US012743392B2

(12) United States Patent
Shi et al.

(10) Patent No.: US 12,743,392 B2
(45) Date of Patent: Sep. 22, 2026

(54) CONTROL DEVICE, CONTROL METHOD AND STORAGE MEDIUM

(71) Applicant: Schneider Electric (China) Co., Ltd., Beijing (CN)

(72) Inventors: Ying Shi, Beijing (CN); Minglei Hei, Beijing (CN); Haiqing Lang, Beijing (CN)

(73) Assignee: Schneider Electric (China) Co., Ltd., Beijing (CN)

( * ) Notice: Subject to any disclaimer, the term of this patent is extended or adjusted under 35 U.S.C. 154(b) by 0 days.

(21) Appl. No.: 18/521,055

(22) Filed: Nov. 28, 2023

(65) Prior Publication Data

US 2025/0139041 A1 May 1, 2025

(51) Int. Cl.
*G06F 13/40* (2006.01)

(52) U.S. Cl.
CPC .................................. *G06F 13/404* (2013.01)

(58) Field of Classification Search
CPC ....................................................... G06F 1/189
See application file for complete search history.

(56) References Cited

U.S. PATENT DOCUMENTS 6,065,068 A * 5/2000 Foote .................... G06F 13/409 710/36
11,316,712 B2 4/2022 Zhan et al.
2006/0015586 A1 1/2006 Sharma et al.
2008/0320181 A1 12/2008 Lauterbach et al.
2012/0221755 A1 8/2012 Schultz
2012/0254377 A1 10/2012 Bernhard et al.
2013/0282941 A1 10/2013 van Dijk
2013/0301584 A1 11/2013 Addepalli et al.
2016/0179675 A1 6/2016 Fahim et al.
2016/0205066 A1 7/2016 Attarwala et al.
2016/0320993 A1* 11/2016 Oota .................. G06F 11/2089
2020/0320027 A1 10/2020 Hansing et al.
2021/0049121 A1 2/2021 Buenaventura et al.
2022/0141049 A1 5/2022 Lee
2023/0131136 A1 4/2023 Wang et al.

OTHER PUBLICATIONS

Extended European Search Report dated May 7, 2024 for corresponding European Patent Application No. 23212365.3-1215, 9 pages.

(Continued)

*Primary Examiner* — Henry Tsai
*Assistant Examiner* — Juanito C Borromeo
(74) *Attorney, Agent, or Firm* — Kinney & Lange, P.A.

(57) ABSTRACT

Embodiments of the disclosure disclose a control device, control method and storage medium. The control device includes: a plurality of connection units respectively connected to a bus in the control device; one or more bus units, wherein each of the one or more bus units is configured to, in response to being connected to a connection unit of the plurality of connection units, obtain a bus address for the bus and corresponding to the connection unit; and a gateway connected to the bus and adapted to communicate with a controller, and the gateway configured to perform information exchange between the controller and the one or more bus units based on the respective bus addresses of the one or more bus units.

18 Claims, 5 Drawing Sheets

(56) References Cited

OTHER PUBLICATIONS

Extended European Search Report dated May 3, 2024 for corresponding European Patent Application No. 23213062.5-1215, 7 pages.
Extended European Search Report dated May 16, 2024 for corresponding European Patent Application No. 3 23213319.9-1201, 8 pages.
Non-final Office Action dated Jan. 29, 2025 from U.S. Appl. No. 18/522,879.

* cited by examiner

CONTROL DEVICE, CONTROL METHOD AND STORAGE MEDIUM

CROSS REFERENCE

This application claims the priority to Chinese Patent Application No. 202311403224.2 filed on Oct. 26, 2023 and entitled "Control Device, Control Method and Storage Medium", which is hereby incorporated by reference in its entirety.

FIELD

Embodiments of the present disclosure relate to the field of electrical device, and more particularly to a control device, control method and storage medium.

BACKGROUND

With the development of power electronics technology, circuit breaker, contactor, and motor protector are integrated onto a device (e.g., a motor starter), thereby reducing the system volume. In this case, each motor starter communicates with control device (e.g., a programmable logic controller (PLC)) for automated control and monitoring via a bus. In a scenario in which a large number of motor starters are configured, how to allocate a communication address to the inter and how to adapt communication protocol to the outside is a problem to be solved.

SUMMARY

Embodiments of the present disclosure provide a control device, control method and storage medium.

In a first aspect of the present disclosure, a control device is provided. The device comprises: a plurality of connection units respectively connected to a bus in the control device; one or more bus units, wherein each of the one or more bus units is configured to, in response to being connected to a connection unit of the plurality of connection units, obtain a bus address for the bus and corresponding to the connection unit; and a gateway connected to the bus and adapted to communicate with a controller, and the gateway configured to perform information exchange between the controller and the one or more bus units based on the respective bus addresses of the one or more bus units.

In some embodiments of the first aspect, the plurality of connection units are configured to store respective location identifications, wherein the location identification stored in each of the plurality of connection units is related to a location of the connection unit in the control device, and wherein each of the one or more bus units is configured to obtain the bus address for the bus and corresponding to the connection unit by: obtaining the location identification stored by the connected connection unit; and converting the obtained location identification into the bus address.

In some embodiments of the first aspect, each of the one or more bus units is further configured to store the obtained location identification.

In some embodiments of the first aspect, the gateway is further configured to: obtain a first location identification stored in a first bus unit in response to the first bus unit being connected to a first connection unit of the plurality of connection units; and verify consistency of the first location identification and a second location identification stored in the first connection unit.

In some embodiments of the first aspect, the gateway is further configured to: in response to the first location identification being inconsistent with the second location identification, present a first prompt information via the first bus unit, where the first prompt information indicates a connection error of the first bus unit.

In some embodiments of the first aspect, the gateway is further configured to: maintain a mapping relationship between respective bus addresses of the one or more bus units and respective unit identifications of the one or more bus units, and the respective unit identifications being used by the controller.

In some embodiments of the first aspect, the gateway is configured to perform the information exchange by: receiving a data access instruction from the controller, the data access instruction comprising a target unit identification of the bus unit to be accessed and a first storage address of data to be accessed; determining, based on the mapping relationship, a target bus address corresponding to the target unit identification from the respective bus addresses; converting the first storage address into a second storage address applicable to the bus; and executing the data access instruction according to the target bus address and the second storage address.

In some embodiments of the first aspect, the gateway is further configured to: obtain respective operation data in the one or more bus units based on the respective bus addresses of one or more bus units; store the respective operational data in the gateway according to the respective bus addresses and operation data of the one or more bus units applicable to the storage address of the bus in the respective bus units; and wherein the gateway is configured to execute the data access instruction by: reading operation data corresponding to the target bus address and the second storage address from the stored respective operation data; and sending the read operation data to the controller.

In some embodiments of the first aspect, the gateway is further configured to: obtain, via the bus, respective setting information of the one or more bus units; and store the respective setting information of the one or more bus units.

In some embodiments of the first aspect, the gateway is further configured to: in response to determining that a second bus unit connected to a second connection unit of the plurality of connection units is replaced with a third bus unit, determine whether a model of the third bus unit matches a model of the second bus unit; in response to determining that the model of the third bus unit does not match the model of the second bus unit, present, via the third bus unit, a second prompt information indicating that the models do not match; and in response to determining that the model of the third bus unit matches the model of the second bus unit, configure the third bus unit based on the stored setting information of the second bus unit.

In some embodiments of the first aspect, the gateway comprises a plurality of circuit boards respectively applicable to different communication protocols, and the gateway is further configured to switch between the plurality of circuit boards according to the communication protocols between the gateway and the controller.

In a second aspect of the present disclosure, a control method is provided. The method comprises: each of one or more bus units obtaining, in response to being connected to a connection unit of a plurality of connection units, a bus address for the bus and corresponding to the connection unit; and a gateway performing information exchange between the controller and the one or more bus units based on the respective bus addresses of the one or more bus units.

In some embodiments of the second aspect, the plurality of connection units store respective location identifications, wherein the location identification stored in each of the plurality of connection units is related to a location of the connection unit in the control device, and wherein each of the one or more bus units obtains the bus address for the bus and corresponding to the connection unit by: obtaining the location identification stored by the connected connection unit; and converting the obtained location identification into the bus address.

In some embodiments of the second aspect, each of the one or more bus units is further stores the obtained location identification.

In some embodiments of the second aspect, the method further comprises: the gateway obtains a first location identification stored in a first bus unit in response to the first bus unit being connected to a first connection unit of the plurality of connection units; and the gateway verifies consistency of the first location identification and a second location identification stored in the first connection unit.

In some embodiments of the second aspect, the method further comprises: in response to the first location identification being inconsistent with the second location identification, the gateway presents a first prompt information via the first bus unit, where the first prompt information indicates a connection error of the first bus unit.

In some embodiments of the second aspect, the method further comprises: the gateway maintains a mapping relationship between respective bus addresses of the one or more bus units and respective unit identifications of the one or more bus units, and the respective unit identifications being used by the controller.

In some embodiments of the second aspect, the gateway performs the information exchange by: receiving a data access instruction from the controller, the data access instruction comprising a target unit identification of the bus unit to be accessed and a first storage address of data to be accessed; determining, based on the mapping relationship, a target bus address corresponding to the target unit identification from the respective bus addresses; converting the first storage address into a second storage address applicable to the bus; and executing the data access instruction according to the target bus address and the second storage address.

In some embodiments of the second aspect, the method further comprises: the gateway obtains respective operation data in the one or more bus units based on the respective bus addresses of one or more bus units; the gateway stores the respective operational data in the gateway according to the respective bus addresses and operation data of the one or more bus units applicable to the storage address of the bus in the respective bus units; and wherein the gateway executes the data access instruction by: reading operation data corresponding to the target bus address and the second storage address from the stored respective operation data; and sending the read operation data to the controller.

In some embodiments of the second aspect, the method further comprises: the gateway obtains, via the bus, respective setting information of the one or more bus units; and the gateway stores the respective setting information of the one or more bus units.

In some embodiments of the second aspect, the method further comprises: in response to determining that a second bus unit connected to a second connection unit of the plurality of connection units is replaced with a third bus unit, the gateway determines whether a model of the third bus unit matches a model of the second bus unit; in response to determining that the model of the third bus unit does not match the model of the second bus unit, the gateway presents, via the third bus unit, a second prompt information indicating that the models do not match; and in response to determining that the model of the third bus unit matches the model of the second bus unit, the gateway configures the third bus unit based on the stored setting information of the second bus unit.

In some embodiments of the second aspect, the gateway comprises a plurality of circuit boards respectively applicable to different communication protocols, and the method further comprises: the gateway switches between the plurality of circuit boards according to the communication protocols between the gateway and the controller.

In a third aspect of the present disclosure, a machine-readable storage medium is provided. The machine-readable storage medium having a program stored thereon, the program, when executed by a processor, causing the method of the third aspect to be implemented.

By the following description, it will be understood that according to an embodiment of the present disclosure, for a bus unit, a communication scheme for obtaining a bus address via a connection unit is provided. The bus unit is connected to the connection unit and powered on to work, so that the time for configuring the bus address is saved. In this way, the working efficiency of installation, debugging and maintenance can be improved. Other benefits will be described below in connection with the respective embodiments.

It would be appreciated that the content described in the Summary section of the present invention is neither intended to identify key or essential features of the implementations of the present disclosure, nor is it intended to limit the scope of the present disclosure. Other features of the present disclosure will be readily envisaged through the following description.

BRIEF DESCRIPTION OF THE DRAWINGS

In conjunction with the accompanying drawings and with reference to the following detailed description, the above and other features, advantages and aspects of the various embodiments of the present disclosure will become more apparent.

DETAILED DESCRIPTION

Figure 1:
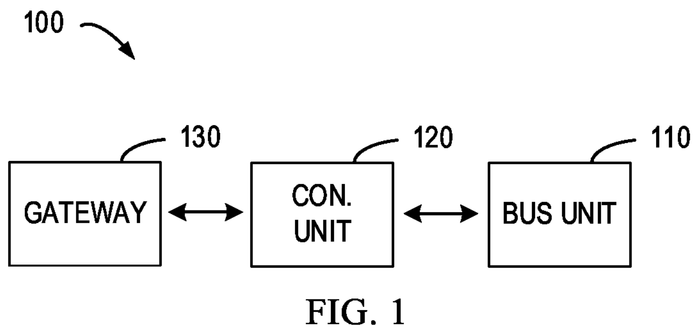
FIG. 1 illustrates a schematic unit diagram of a control device according to some embodiments of the present disclosure.

The embodiments of the present disclosure will be described in more detail below with reference to the accompanying drawings. Although some implementations of the present disclosure are shown in the drawings, it would be appreciated that the present disclosure can be implemented in various forms and should not be interpreted as limited to the implementations described herein. On the contrary, these implementations are provided for a more thorough and complete understanding of the present disclosure. It would be appreciated that the drawings and implementations of the present disclosure are only for illustrative purposes and are not intended to limit the scope of protection of the present disclosure.

In the description of the embodiments of the present disclosure, the term "including" and similar terms should be understood as open-ended inclusion, that is, "including but not limited to". The term "based on" should be understood as "at least partially based on". The terms "one embodiment" or "the embodiment" should be understood as "at least one embodiment". The term "some embodiments" should be understood as "at least some embodiments". The following may also include other explicit and implicit definitions. The terms "first", "second", etc. may refer to different or identical objects. The following may also include other explicit and implicit definitions.

As briefly mentioned above, the circuit breaker, contactor, and motor protector can be integrated onto a motor starter. A motor control cabinet (e.g., the motor control center MCC) can include several (e.g., 8-16) motor starters. Each motor starter can communicate with the PLC device via the physical protocol interface of the motor protector. With the development of power electronics technology, the motor control cabinet can configure with more motor starters, such as 64. In this case, each motor starter is connected to the communication port of the PLC device through a bus, which faces many problems. For example, each motor starter needs to implement a communication protocol adapted to a different PLC device, which results in an excessively high total cost of the system. For another example, communication between a large number of motor starters and a PLC device is supported through an existing bus communication protocol, the bus data throughput is too high, and overall communication timeliness is greatly affected.

The above takes a motor control cabinet as an example for the control device, and takes the motor starter as an example for a bus unit is to describe the problems faced by configuring a large number of bus units by a control device. In order to solve or at least partially solve such problems, embodiments of the present disclosure provide a communication scheme for a bus unit to obtain a bus address via a connection unit. The bus unit is connected to the connection unit and powered on to work, so that the time for configuring the bus address is saved.

According to embodiments of the present disclosure, the control device includes a plurality of connection units, one or more bus units and a gateway. The plurality of connection units are respectively connected to a bus in the control device. Each bus unit is connected to a connection unit and is configured to obtain, in response to being connected to the connection unit, a bus address for the bus corresponding to the connection unit. The gateway is connected to the bus and adapted to communicate with the controller, and the gateway is configured to perform information exchange between the controller and the bus unit based on the respective bus addresses of the bus unit. In this way, the efficiency of installation, debugging, and maintenance can be improved.

Some example embodiments of the present disclosure will be described below with reference to the accompanying drawings. Please note that in several descriptions of embodiments, in order to better assist readers in understanding, certain specific numerical values may be involved. These numerical values are exemplary and may vary according to specific application scenarios, and do not limit the scope of the present disclosure in any way.

Below will be described in conjunction with FIG. 1 includes a schematic structural diagram of a control device according to some embodiments of the present disclosure, in conjunction with FIGS. 2A and 2B to describe an example topology structure of the control device, and in conjunction with FIG. 3 to describe the internal and external communication interaction of the control device schematic diagram.

Referring first to FIG. 1, the control device 100 may include a plurality of connection (con.) units 120. The connection unit 120 includes, for example, a slot, interface or port to be connected to the bus unit 110. The bus unit 110 may include various suitable devices required in the control device 100. In some embodiments, the bus unit 110 may be implemented in the form of a drawer and therefore may also be referred to as a drawer. The respective control device 100 may also be referred to as a drawer cabinet. In some embodiments, the control device 100 may be a motor control cabinet, and the bus unit 110 may be a motor starter.

The plurality of connection units 120, for example, form part of the backplane connector. The plurality of bus units 110 are physically connected together through the backplane connector, so that these bus units 110 can share power and data signals. In addition, the backplane connector provides mechanical stability and reliability, ensuring that each bus unit is properly inserted and in good contact.

The control device 100 may further include a gateway 130. The gateway 130 may be implemented by hardware devices or software for address allocation and conversion, data processing and analysis, protocol conversion, routing and other functions.

In some embodiments, the control device 100 may further include a housing, guide rail, baffles, or the like. The housing is, for example, made of metal or synthetic material to protect the bus unit 110 and connection unit 120 from environmental factors such as physical damage, dust or moisture. The guide rail is, for example, made of steel, so that the bus unit 110 can be smoothly pushed and pulled out. The baffle is, for example, made of metal or synthetic material for separating and organizing the internal space in order to better accommodate the bus unit 110.

It should be understood that although only one connection unit 120 and a bus unit 110 are shown in FIG. 1, but the control device 100 may include a plurality of connection units 120 and one or more bus units 110.

Figure 2A:
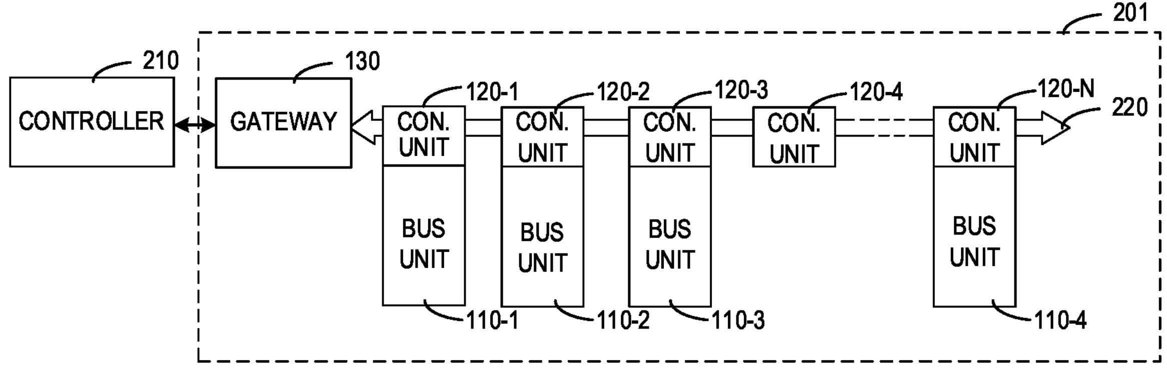
FIGS. 2A and 2B illustrate a schematic diagram of a topology structure of a control device according to some embodiments of the present disclosure.
Figure 2B:
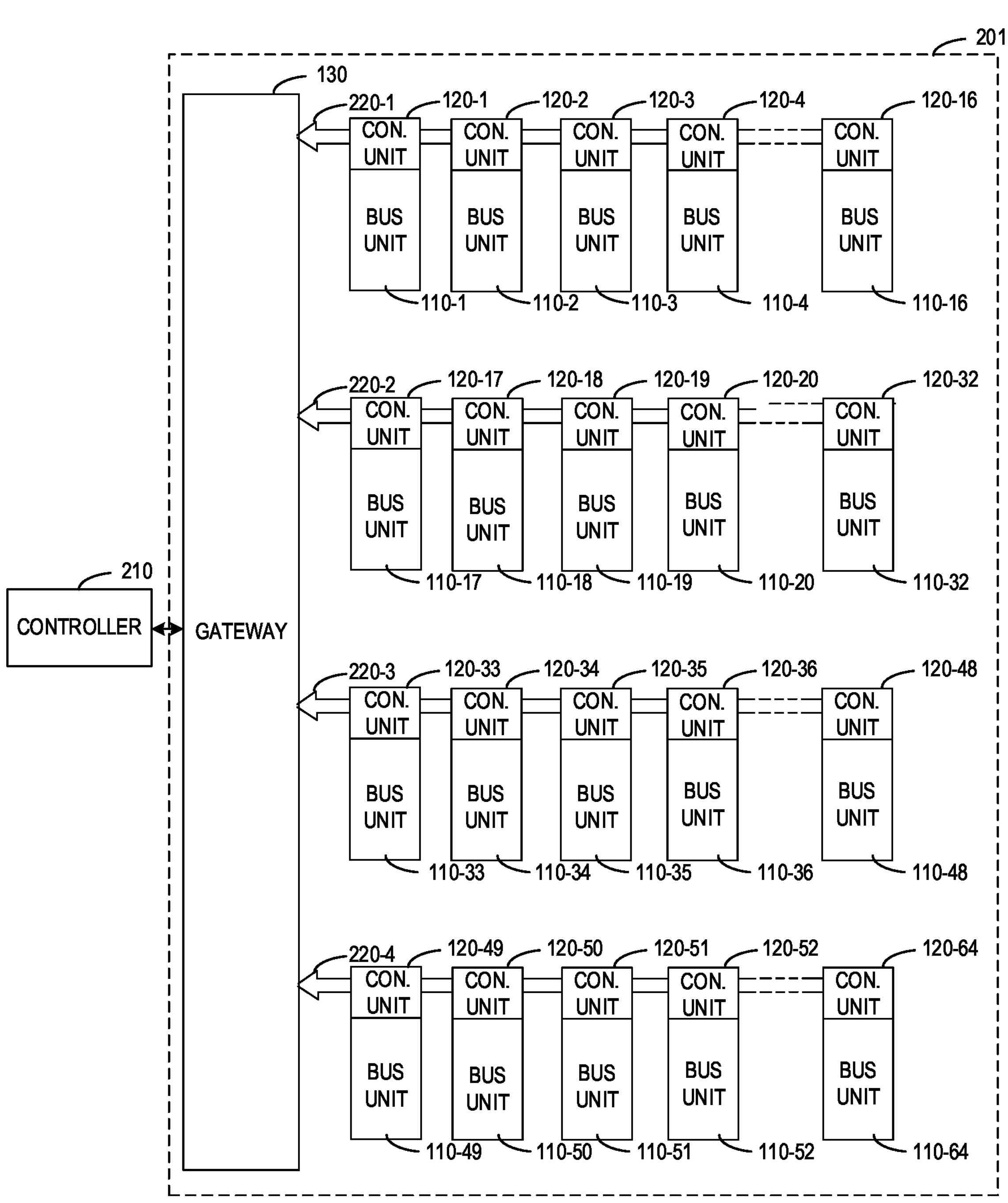

FIGS. 2A and 2B illustrate a schematic diagram of a topology structure of a control device 201 according to some embodiments of the present disclosure. The control device 201 includes a gateway 130, a plurality of bus units 110 (such as bus unit 110-1, bus unit 110-2, . . . , bus unit 110-4, which may be collectively or individually referred to as bus unit 110), a plurality of connection units 120 (such as connection unit 120-1, connection unit 120-2, . . . , connection unit 120-N, which may be collectively or individually referred to as connection unit 120), and a bus 220 coupled to gateway 130. The bus 220 is used for communication between various parts within the control device 201 and is therefore also referred to as an internal communication bus.

The plurality of connection units 120 are respectively connected to the bus 100 in the control device. The bus unit 110 is connected to the connection unit 120 and obtains a bus address corresponding to the connected connection unit 120. The bus unit 110 may include, for example, a memory for storing the obtained bus address. The bus address stored in each bus unit 110 is unique, so that the gateway 130 distinguishes the bus unit 110 connected to each connection unit 120.

In some embodiments, such a bus address may be pre-configured by the gateway 130 and stored in the bus unit 110. For example, the host computer configures and stores the address in the bus unit 110 through the gateway 130. In this case, the address stored by each bus unit 110 can be dynamically changed. In other embodiments, such a bus address may be related to the location identification stored by the connection unit 120. In this case, the connection unit 120 may include non-volatile memory (NVM) for storing the respective location identification. Each connection unit 120 may store different location identification, such that after the bus unit 110 is connected to the connection unit 120, the location identification will be obtained by the bus unit 110 and converted into a bus address. The location identification stored in each connection unit 120 is fixed.

In some embodiments, the location identification stored in each connection unit 120 is associated with the location of the connection unit 120 in the control device 100.

In the example of FIG. 2A, the plurality of connection units 120 are arranged in series along the bus 220 and respectively adapted to be connected to one bus unit 110. For example, connection unit 120-1 is connected to bus unit 110-1, connection device 120-2 is connected to bus unit 110-2, connection unit 120-3 is connected to bus unit 110-3, and so on. For the case where location identification is fixed, for example, the control device 201 is implemented in the form of a drawer cabinet, and the bus unit 110 is implemented in the form of a drawer. Each slot in the drawer cabinet is fixed to correspond to a communication address. The location identification is preset by the connection unit 120 on the slot according to the rule that is incremented from left to right. As shown in FIG. 2A, the location identification stored in the connection unit 120-1 is 1, the location identification stored in the connection unit 120-2 is 2, . . . , and the location identification stored in the connection unit 120-N is N. These connection units 120 are connected in series together by bus 220, so as to form a T-shaped topology structure with the bus unit 110. In embodiments of the present disclosure, the connection unit 120 is adapted to be connected to the bus unit 110, but in some cases, it is not required for each connection unit 120 is connected to the bus unit 110.

In some embodiments, if the one or more connection units 120 are not connected to any bus unit 110 (e.g., in FIG. 2A, the connection unit 120-4 is not connected to the bus unit 110) or the connected bus unit 110 fails, the location identification stored by such one or more connection units 120 according to the disclosed embodiment remains unchanged. For example, the location identification stored in the connection unit 120-4 is 4, and the location identification stored in the connection unit 120-N is N. If the bus unit 110-4 is connected to the connection unit 120-4, the location identification obtained is 4. If the bus unit 110-4 is connected to the connection unit 120-N, the location identification obtained is N. It should be understood that such a location identification is merely exemplary and any other suitable style, such as letter combinations or binary sequences of numbers, can be used, which is not limited by the present disclosure.

In some embodiments, the bus unit 110 may store the location identification obtained. As shown in FIG. 2A, the bus unit 110-4 is inserted into the slot corresponding to the connection unit 120-N, and the location identification N stored in the connection unit 120-N is obtained after power-on and stored locally.

In some embodiments, the gateway 130 can obtain the location identification (also referred to as a first location identification) stored by the bus unit 110 (also referred to as a first bus unit) and the location identification (also referred to as a second location identification) stored in the connection unit 120 (also referred to as a first connection unit), and verify whether the two location identifications are consistent. Continuing the above example, the bus unit 110-4 is first inserted into the slot corresponding to the connection unit 120-N, ang obtains and stores the location identification N. The bus unit 110-4 is extracted, for example, for purposes of maintenance or repair. When the bus unit 110-4 is inserted again, it is mistakenly inserted into the slot corresponding to the connection unit 120-4. In this case, the gateway 130 verifies whether the location identification N stored by the bus unit 110-4 is consistent with the location identification 4 stored in the connection unit 120-4.

In some embodiments, the gateway 130 may present a prompt information (also referred to as a first prompt information) via the bus unit 110 in response to the location identification N stored in the bus unit 110 being inconsistent with the location identification stored in the connection unit 120. Such a prompt information indicates a connection error of the bus unit 110. For example, the bus unit 110 includes a human-machine interaction interface (HMI). Such an HMI interface is implemented, for example, as a liquid crystal screen. The bus unit 110 prompts, via the HMI, whether the slot inserted by the user is the original slot. In some scenarios, the bus unit 110 may not pass the verification of the gateway 130 due to other reasons (e.g., surge voltage) causing the stored location identification to be abnormal. In such cases, the bus unit 110 may also present prompt information. This can be performed by setting appropriate verification rules at the gateway 130 and presenting the corresponding prompt information via the bus unit 110.

In some embodiments, the gateway 130 may obtain and store the respective setting information of the bus unit 110 via the bus 220. For example, when the host computer configures the bus unit 110 via the gateway 130, such as, the rated current, motor type, protection curve, forward and reverse rotation, and whether or not to soft start, etc. of the bus unit 110, the gateway 130 may store such configuration information.

In some embodiments, the bus unit 110 (also referred to as the second bus unit) connected to a certain connection unit 120 (also referred to as the second connection unit) is replaced with another bus unit 110 (also referred to as the third bus unit), and the gateway 130 can determine whether the models of the two bus units 110 match. If the models of the two bus units 110 do not match, the gateway 130 can present, via the third bus unit, prompt information (also referred to as the second prompt information) indicating that the model does not match. If the models of the two bus units 110 match, the gateway 130 can configure the third bus unit based on the stored setting information of the second bus unit.

In this way, a quick replacement configuration of the bus unit can be realized. For example, after replacing the original bus unit 110, the gateway 130 can compare the model information of the new bus unit 110 and the original bus unit 110. If the models of the two bus units 110 are consistent, the gateway 130 can download the stored setting information to the new bus unit 110, either directly or based on a user instruction. And if the models of the two bus units 110 are inconsistent, the gateway 130 can present prompt information via the HMI of the new bus unit 110, such as prompting that the new bus unit 110 needs to be configured.

The processing capacity of a single bus is taken into account, if one bus connects too many bus units, it may affect the overall communication timeliness due to an excessively high data throughput. In order to solve such problem, the connection units 120 in the control device 110 can be divided into a plurality of groups, for example, they can be grouped according to the physical location of these connection units in the control device 110. The connection units in the same group are coupled to the gateway 130 through the same bus.

FIG. 2B illustrates a schematic diagram of a gateway 130 connecting 64 bus units 110. The gateway 130 supports, for example, four internal bus interfaces and connects buses 220-1 to 220-4, respectively. The buses 220-1 to 220-4 can be collectively or individually referred to as bus 220. The connection unit 120-1 to the connection unit 120-16 are arranged in series along the bus 220-1 and adapted to connect to the corresponding bus units 110-1 to bus units 110-16. The connection unit 120-17 to connection unit 120-32 are arranged in series along bus 220-2 and adapted to connect to corresponding bus units 110-32 to bus units 110-32. The connection unit 120-33 to connection unit 120-48 are arranged in series along bus 220-3 and adapted to connect to corresponding bus units 110-33 to bus units 110-48. The connection units 120-49 to connection units 120-64 are arranged in series along bus 220-4 and adapted to connect to corresponding bus units 110-49 to bus units 110-64, respectively. Thus, each bus 220 (via connection unit 120) connects 16 bus units 110, and the gateway 130 connects a total of 64 bus units 110 via 4 buses 220 (via connection unit 120). In this way, data fast interaction between the gateway and the high-density bus unit in the cabinet can be achieved.

In the example of FIG. 2B, the control device 201 is implemented, for example, in the form of the drawer cabinet, the bus unit 110 is implemented, for example, in the form of a drawer. The 64 connection units 120 are arranged, for example, in the drawer cabinet according to a physical layout manner of 8 layers×8 columns. For example, the connection units 120-1 to 120-8 are sequentially arranged on the first layer of the drawer cabinet in order from left to right, and the connection units 120-9 to 120-16 are sequentially arranged on the second layer of the drawer cabinet in order from left to right. Such 16 connection units 120 share the bus 220-1. Similarly, in order from top to bottom, every 16 connection units 120 occupy two layers of the drawer cabinet. Each slot corresponding to 64 connection units 120 fixes a corresponding communication address. If the location identification is preset according to the rule that increases from left to right and from top to bottom, the location identification stored in connection unit 120-1 is 1, the location identification stored in connection unit 120-2 is 2, . . . , and the location identification stored in connection unit 120-64 is 64. Therefore, two adjacent layers of drawers share an internal communication bus. The location identification is implemented according to a physical sequence, if the corresponding slot is not inserted into the drawer, that is, the corresponding connection unit 120 is not connected to the bus unit 110, the location identification can be skipped. The communication bus of every two layers can access any internal communication bus interface of gateway 130, and the gateway 130 implements self-adaptation of the internal communication bus address and location identification. In this way, on-site bus configuration work can be saved and the working efficiency can be improved.

It should be understood that the specific values (e.g., 64, 16, etc.) involved in the example of FIG. 2B are only exemplary and can vary according to specific application scenarios, which is not limited in the present disclosure.

The control device 201 can communicate with the controller 210, receive and execute instruction of the controller 210, and return respective data and the like. Specifically, the control device 201 is connected to the bus 220 through the gateway 130 and communicates with the controller 210. The gateway 130 can perform information exchange between the controller 210 and the bus unit 110 based on the respective bus addresses of the bus unit 110. The gateway 130 may include non-volatile memory.

In some embodiments, the communication on bus 220 is based on a first communication protocol, and communication between gateway 130 and controller 210 is based on a second communication protocol. The first communication protocol may be the same as or different from the second communication protocol. For example, the first communication protocol and the second communication protocol may both be Modbus protocols. For another example, the first communication protocol may be a Controller Area Network (CAN) bus protocol, a Controller Area Network Flexible Data Rate (CAN FD) bus protocol, a Modbus protocol, etc. The second communication protocol may be a Modbus protocol, ProfNet protocol, Ethernet IP protocol, etc. It should be understood that the first and second communication protocols may be any suitable existing or future communication protocol, which is not limited in the present disclosure.

In some embodiments, the gateway 130 may include a plurality of circuit boards respectively applicable to different communication protocols. Such a gateway 130 can switch between the plurality of circuit boards according to the communication protocol between the gateway 130 and controller 210. For example, the gateway 130 includes a first circuit board that supports Modbus protocol, a second circuit board that supports ProfNet protocol, and a third circuit board that supports Ethernet IP protocol. If the gateway 130 communicates with controller 210 that supports Modbus protocol, the first circuit board can be used. If the gateway 130 communicates with controller 210 that supports Ethernet IP protocol, it can switch to the third circuit board. In this way, different communication boards can be flexibly adapted to achieve rapid iteration of products and rapid delivery of project.

In some embodiments, the control device 100 may include a plurality of gateways 130 to achieve redundant configuration of the primary and standby gateway 130. In other words, after a failure of the gateway 130 function, the gateway 130 can quickly switched to another gateway 130, thereby improving the communication stability of the control device 100.

In an example scenario, the controller 210 may be a PLC. The control device 201 may be a Motor Control Center (MCC), and the gateway 130 may be a header device of the MCC. The connection unit 120 may be a communication slot module (e.g., a T-shaped communication slot module). The bus unit 110 may be a motor starter (e.g., a motor starter with integrated circuit breakers, contactors, and motor protectors). This scenario will be used as an example below, and the internal and external communication interactions of control device 201 will be described in conjunction with FIG. 3.

Figure 3:
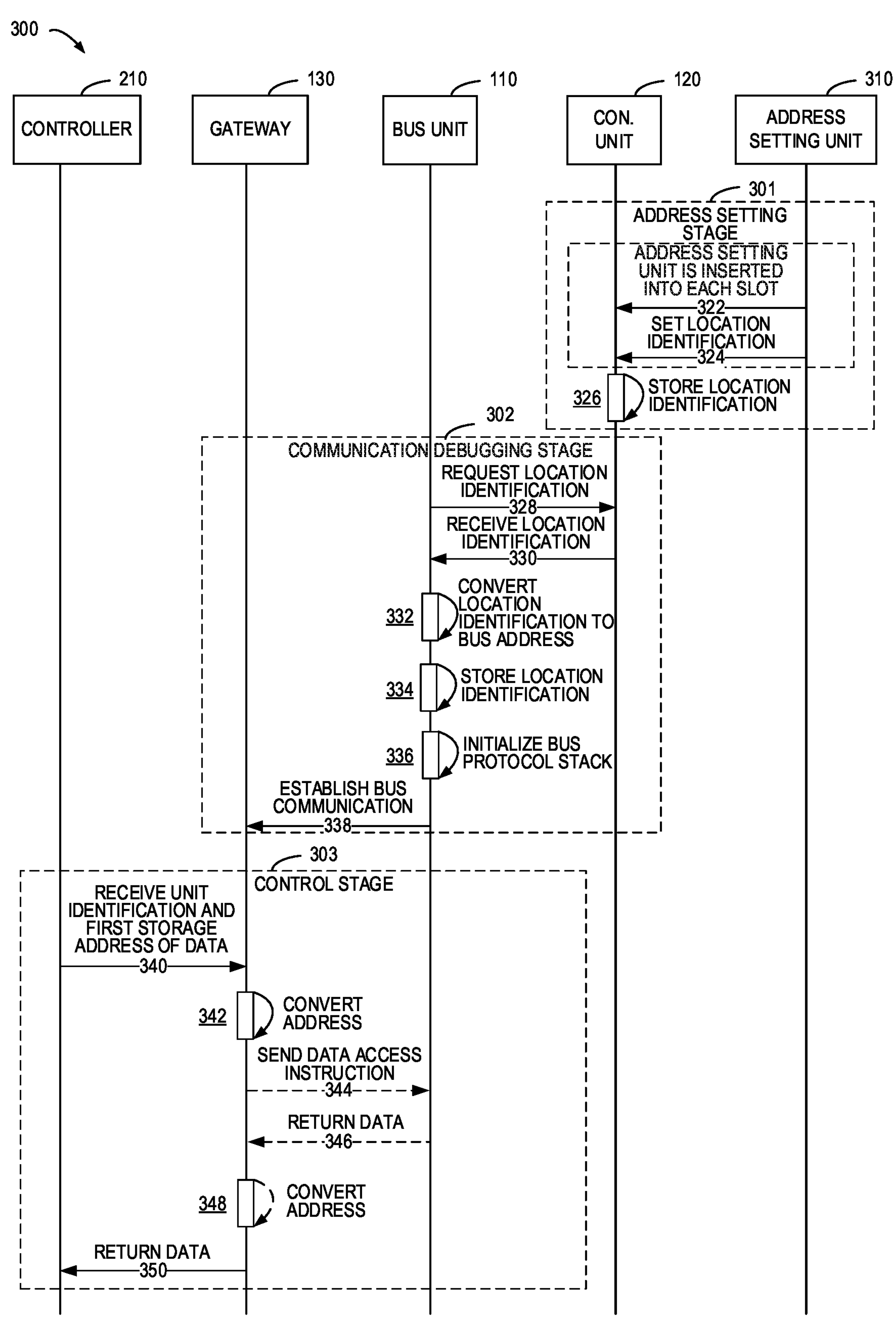
FIG. 3 illustrates a schematic diagram of the internal and external communication interaction of the control device according to some embodiments of the present disclosure.

FIG. 3 illustrates a schematic diagram of an example 300 of internal and external communication interaction of the control device according to some embodiments of the present disclosure. Example 300 is generally divided into three stages: an address setting stage 301, a communication debugging stage 302 and a control stage 303.

At the address setting stage 301, example 300 relates to the connection unit 120 and the address setting unit 310. For example, during factory debugging, the address setting unit 310 (e.g., the address setting drawer) is inserted (322) one slot in the control device 201 (e.g., the drawer cabinet). In the slot, the address setting unit 310 is connected to the connection unit 120 corresponding to the slot. The address setting unit 310 sets (324) the location identification of the connection unit 120. The connection unit 120 receives and stores (326) the location identification. Similarly, the location identification of the connection unit 120 corresponding to all the slots may be set.

In the communication debugging stage 302, example 300 involves the bus unit 110, connection unit 120, and gateway 130. The bus unit 110 sends (328) a request for location identification to the connected connection unit 120 and receives (330) its stored location identification from the connection unit 120. Further, the bus unit 110 converts (332) the location identification into a bus address. In order to support error prevention verification of gateway 130, the bus unit 110 can store (334) the location identification. Further, the bus unit 110 can convert the location identification to a bus address and initialize (336) the bus protocol stack, thereby establishing (338) bus communication with the gateway 130.

In the control stage 303, example 300 relates to the bus unit 110, the gateway 130, and the controller 210 to perform information exchange between the controller 210 and the bus unit 110, in some embodiments, the gateway 130 may maintain a mapping relationship between the respective bus address of bus unit 110 and the respective unit identification. Such unit identification is used by the controller 210. The specific form of unit identification may depend on the protocol used for communication between the gateway 130 and the controller 210. For example, in the case of Modbus protocol, the unit identification can be a slave device ID (SlaveID) of a slave device to which the controller 210 is connected as the master device. Based on such a mapping relationship, the gateway 130 can receive instruction from the controller 210 and determine a data location expected to be read by the controller 210 indicated by the instruction.

In some embodiments, the gateway 130 may receive data access instruction from controller 210. Such data access instruction include the target unit identification of the bus unit 110 to be accessed and the first storage address of the data to be accessed. Based on the maintained mapping relationship, the gateway 130 may determine the target bus address corresponding to the target unit identification and may convert the first storage address into the second storage address of the applicable bus. Further, the gateway 130 executes the data access instruction according to the target bus address and the second storage address. For example, the bus unit 110 includes, for example, a register. If the bus unit 110 stores the operational data in the register, the first storage address may be the register address of the data to be accessed as perceived by controller 210. Accordingly, the second storage address may be the address of the data as perceived from the vision of the gateway 130 relative to the bus.

Continuing with reference to FIG. 3, the gateway 130 receives (340) a data access instruction from the controller 210 that includes a unit identification and a first storage address of data. The gateway 130 converts (342) the unit identification to a bus address, and converts (342) the first storage address to a second storage address of an applicable bus. Further, the gateway 130 sends (344) a data access instruction including the bus address and the second storage address to the bus unit 110. The bus unit 110 returns (346) the data stored at the corresponding storage location. Further, the gateway 130 converts (348) the bus address to the unit identification, and converts (348) the second storage address to the first storage address of the data. Then, the gateway 130 returns (350) the data to the controller 210.

In some embodiments, the gateway 130 may obtain respective operational data in the bus unit 110 based on the respective bus address of the bus unit 110. Further, the gateway 130 stores the respective operational data in the gateway 130 according to the respective bus address of the bus unit 110 and operational data storage address of the applicable bus in the respective bus unit 110. Thereby, the collection of operational data can be achieved.

For example, in order to improve the efficiency of data interaction between the internal bus unit 110 and the controller 210, the gateway 130 can periodically access and store important or frequently interacting data. In this case, if the gateway 130 receives a data access instruction from the controller 210 that includes the unit identification and the first storage address of the data, the corresponding operation data may be read from the stored respective operation data and the read operation data is sent to the controller 210. For example, the gateway 130 receives (340) a data access instruction from the controller 210 that includes the unit identification and the first storage address of the data. The gateway 130 converts (342) the unit identification to a bus address and converts (342) the first storage address to a second storage address applicable to the bus. Further, the gateway 130 reads the corresponding data from the stored respective data based on the converted bus address and the second storage address, and then returns (350) the data to the controller 210.

In other words, the gateway 130 can centrally map the important or frequently interacted operation data of all bus unit 110 into a continuous storage address, in order to read the controller 210 once, such as reading the rated current of the bus unit 110 at once. In this embodiment, the time to access the respective bus unit 110 is omitted. In this way, the communication timeliness of the controller 210 and the control device 201 can improved.

Figure 4:
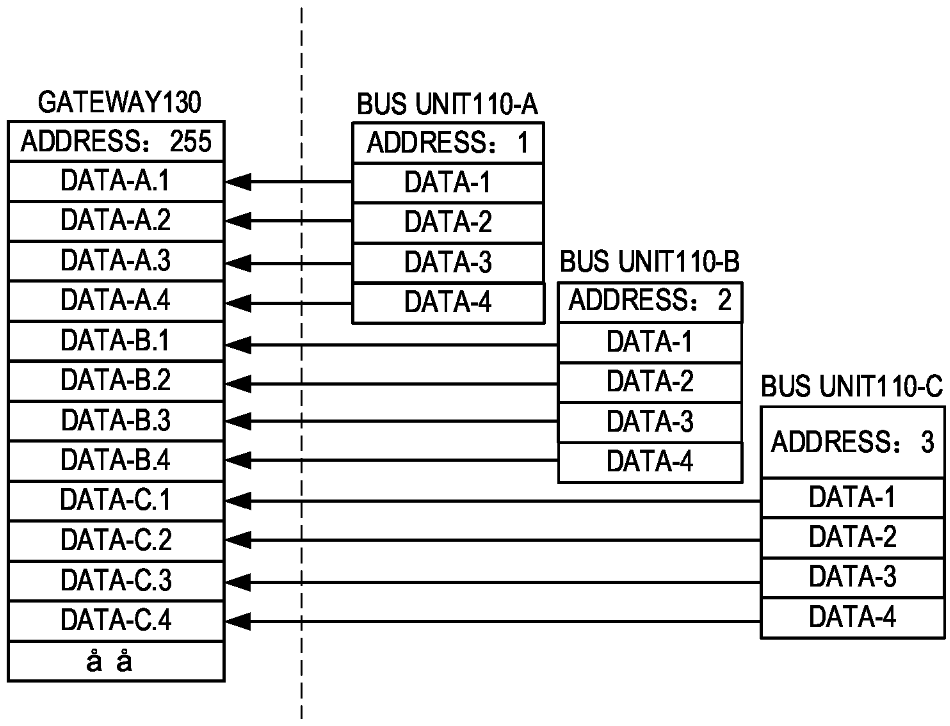
FIG. 4 illustrates a schematic diagram of one example of data collection according to some embodiments of the present disclosure.

FIG. 4 illustrates a schematic diagram of one example of data collection according to some embodiments of the present disclosure. The control device 110 includes, for example, gateway 130, bus unit 110-A with unit identification A, bus unit 110-B with unit identification B, and bus unit 110-C with unit identification C. The bus address of the gateway 130 is 255 and includes storage addresses A.1 to C.4. The bus address of bus unit 110-A is 1 and includes storage addresses 1-4. The bus address of the bus unit 110-B is 2 and includes storage addresses 1-4. The bus address of the bus unit 110-C is 3 and includes storage addresses 1-4.

The gateway 130 can periodically access and store some or all of the data stored in all bus units 110. According to the mapping relationship shown in FIG. 4, the data stored in gateway 130 has a corresponding relationship with the data stored in bus unit 110. For example, the gateway 130 (whose bus address is address 255) can read data-1, data-2, data-3, and data-4 from bus unit 110-A1 having a bus address of address 1 and store them locally in gateway 130 as data-A.1, data-A.2, data-A.3, and data-A.4, respectively. As another example, the gateway 130 can read data-1, data-2, data-3, and data-4 from bus unit 110-B with bus address 2 and store them locally as data-B.1, data-B.2, data-B.3, and data-A.4, respectively. The gateway 130 can periodically access the bus unit 110 and update the respective stored data. Therefore, from the perspective of the controller 210, there is no need to care about which specific bus unit 110 to access, it only needs to send data access instruction to the gateway 130, and the gateway 130 can quickly return the respective data to the controller 210. Especially, when the controller needs to read a certain piece of operation data (e.g., rated current) of each bus unit in batches, such a data collection mode greatly improves query efficiency.

It should be understood that the specific values (e.g., 255, 1-4, etc.) involved in the example of FIG. 4 are only exemplary and can vary according to specific application scenarios, which is not limited in the present disclosure.

In summary, the present disclosure provides a control device for internal and external communication scheme. For the bus unit, the bus address can be obtained through the connection unit, so that the bus unit can be connected to the connection unit and powered on to work, the time for configuring the bus address is omitted. In this way, the work efficiency of installation, debugging and maintenance can be improved. The plurality of bus units can be grouped and connected to different buses to avoid affecting communication timeliness due to an excessively high bus data throughput. Furthermore, the bus unit and the gateway can store location identification to support error prevention identification. The gateway can also store the setting information of the bus unit to support rapid replacement of the bus unit. Furthermore, the gateway supports a plurality of communication protocols and can flexibly adapt to the controller to achieve rapid iteration of products and rapid delivery of projects.

Figure 5:
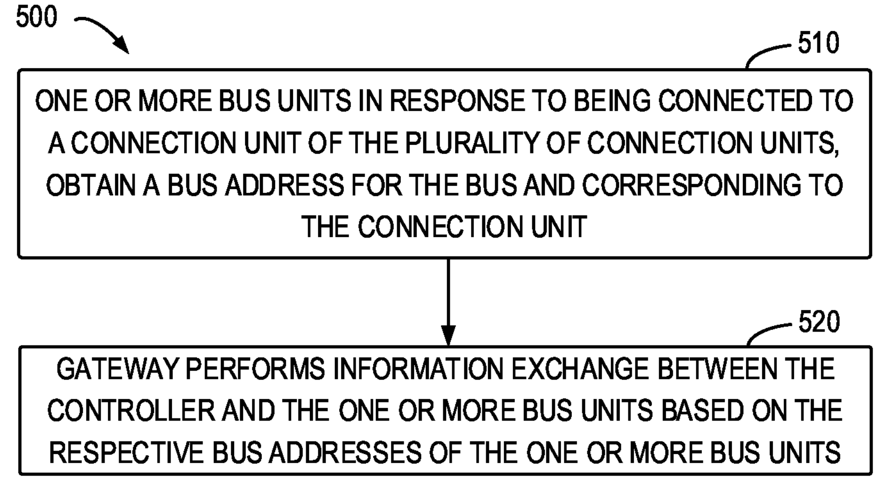
FIG. 5 illustrates a flowchart of an example control method according to some embodiments of the present disclosure.

FIG. 5 illustrates a flowchart of an example control method 500 according to some embodiments of the present disclosure. The method 500 may be implemented, for example, at the control device 100, such as by a micro control unit of the bus unit 110 and a micro control unit of the gateway 130. The method 500 is described below with reference to FIG. 1. It should be understood that the method 500 may include additional actions not shown and/or actions illustrated may be omitted, and the scope of the present disclosure is not limited in this regard.

At block 510, each of the one or more bus units in response to being connected to a connection unit of the plurality of connection units, obtains a bus address for the bus and corresponding to the connection unit. At block 520, the gateway performs information exchange between the controller and the one or more bus units based on the respective bus addresses of the one or more bus units.

In some embodiments, the plurality of connection units store respective location identifications, wherein the location identification stored in each of the plurality of connection units is related to a location of the connection unit in the control device, and wherein each of the one or more bus units obtain the bus address for the bus and corresponding to the connection unit by: obtaining the location identification stored by the connected connection unit; and converting the obtained location identification into the bus address.

In some embodiments, each of the one or more bus units is further store the obtained location identification.

In some embodiments, the method 500 further comprises: the gateway obtains a first location identification stored in a first bus unit in response to the first bus unit being connected to a first connection unit of the plurality of connection units; and the gateway verifies consistency of the first location identification and a second location identification stored in the first connection unit.

In some embodiments, the method 500 further comprises: the gateway in response to the first location identification being inconsistent with the second location identification, present a first prompt information via the first bus unit, where the first prompt information indicates a connection error of the first bus unit.

In some embodiments, the method 500 further comprises: the gateway maintains a mapping relationship between respective bus addresses of the one or more bus units and respective unit identifications of the one or more bus units, and the respective unit identifications being used by the controller.

In some embodiments, the gateway performs the information exchange by: receiving a data access instruction from the controller, the data access instruction comprising a target unit identification of the bus unit to be accessed and a first storage address of data to be accessed; determining, based on the mapping relationship, a target bus address corresponding to the target unit identification from the respective bus addresses; converting the first storage address into a second storage address applicable to the bus; and executing the data access instruction according to the target bus address and the second storage address.

In some embodiments, the method 500 further comprises: the gateway obtains respective operation data in the one or more bus units based on the respective bus addresses of one or more bus units; the gateway stores the respective operational data in the gateway according to the respective bus addresses and operation data of the one or more bus units applicable to the storage address of the bus in the respective bus units; and wherein the gateway executes the data access instruction by: reading operation data corresponding to the target bus address and the second storage address from the stored respective operation data; and sending the read operation data to the controller.

In some embodiments, the method 500 further comprises: the gateway obtains, via the bus, respective setting information of the one or more bus units; and the gateway stores the respective setting information of the one or more bus units.

In some embodiments, the method 500 further comprises: the gateway in response to determining that a second bus unit connected to a second connection unit of the plurality of connection units is replaced with a third bus unit, determine whether a model of the third bus unit matches a model of the second bus unit; the gateway in response to determining that the model of the third bus unit does not match the model of the second bus unit, present, via the third bus unit, a second prompt information indicating that the models do not match; and the gateway in response to determining that the model of the third bus unit matches the model of the second bus unit, configure the third bus unit based on the stored setting information of the second bus unit.

In some embodiments, the gateway comprises a plurality of circuit boards respectively applicable to different communication protocols, and the method 500 further comprises: the gateway switch between the plurality of circuit boards according to the communication protocols between the gateway and the controller.

According to example implementation of the present disclosure, a machine-readable storage medium is provided, on which a machine-executable instruction or machine program is stored, wherein the machine-executable instructions is executed by the processor to implement the method described above. According to example implementation of the present disclosure, a machine program product is also provided. The machine program product is physically stored on a non-transient machine-readable medium and includes machine-executable instructions, which are executed by the processor to implement the method described above.

Various aspects of the present disclosure are described herein with reference to the flow chart and/or the block diagram of the method, the apparatus, the device and the machine program product implemented in accordance with the present disclosure. It would be appreciated that each block of the flowchart and/or the block diagram and the combination of each block in the flowchart and/or the block diagram may be implemented by machine-readable program instructions.

These machine-readable program instructions may be provided to the processing units of general-purpose computers, specialized computers, servers, microcontrollers and clusters thereof, or other programmable data processing devices to produce a machine that generates an apparatus to implement the functions/actions specified in one or more blocks in the flow chart and/or the block diagram when these instructions are executed through the machine or other programmable data processing apparatuses. These machine-readable program instructions may also be stored in a machine-readable storage medium. These instructions enable a machine, a programmable data processing apparatus and/or other devices to work in a specific way. Therefore, the machine-readable medium containing the instructions includes a product, which includes instructions to implement various aspects of the functions/actions specified in one or more blocks in the flowchart and/or the block diagram.

The machine-readable program instructions may be loaded onto a machine, other programmable data processing apparatus, or other devices, so that a series of operational steps may be performed on a machine, other programmable data processing apparatus, or other devices, to generate a machine-implemented process, such that the instructions which execute on a machine, other programmable data processing apparatuses, or other devices implement the functions/acts specified in one or more blocks in the flowchart and/or the block diagram.

The flowchart and the block diagram in the drawings show the possible architecture, functions and operations of the system, the method and the machine program product implemented in accordance with the present disclosure. In this regard, each block in the flowchart or the block diagram may represent a part of a unit, a program segment or instructions, which contains one or more executable instructions for implementing the specified logic function. In some alternative implementations, the functions labeled in the block may also occur in a different order from those labeled in the drawings. For example, two consecutive blocks may actually be executed in parallel, and sometimes can also be executed in a reverse order, depending on the function involved. It should also be noted that each block in the block diagram and/or the flowchart, and combinations of blocks in the block diagram and/or the flowchart, may be implemented by a dedicated hardware-based system that performs the specified functions or acts, or by the combination of dedicated hardware and machine instructions.

Each implementation of the present disclosure has been described above. The above description is an example, not exhaustive, and is not limited to the disclosed implementations. Without departing from the scope and spirit of the described implementations, many modifications and changes are obvious to ordinary skill in the art. The selection of terms used in the present disclosure aims to best explain the principles, practical application or improvement of technology in the market of each implementation, or to enable other ordinary skill in the art to understand the various implementations disclosed herein.

We claim:

1. A control device comprising:

a plurality of connection units respectively connected to a bus in the control device, wherein the plurality of connection units are configured to store respective location identifications, wherein the location identification stored in each of the plurality of connection units is related to a location of the connection unit in the control device;

one or more bus units, wherein each of the one or more bus units is configured to, in response to being connected to a connection unit of the plurality of connection units, obtain a bus address for the bus and corresponding to the connection unit, wherein each of the one or more bus units is configured to obtain the bus address for the bus and corresponding to the connection unit by:

obtaining the location identification stored by the connected connection unit; and converting the obtained location identification into the bus address; and a gateway connected to the bus and adapted to communicate with a controller, and the gateway configured to perform information exchange between the controller and the one or more bus units based on the respective bus addresses of the one or more bus units.

2. The control device of claim 1, wherein each of the one or more bus units is further configured to store the obtained location identification.

3. The control device of claim 2, wherein the gateway is further configured to:

obtain a first location identification stored in a first bus unit in response to the first bus unit being connected to a first connection unit of the plurality of connection units; and verify consistency of the first location identification and a second location identification stored in the first connection unit.

4. The control device of claim 3, wherein the gateway is further configured to:

in response to the first location identification being inconsistent with the second location identification, present a first prompt information via the first bus unit, where the first prompt information indicates a connection error of the first bus unit.

5. The control device of claim 1, wherein the gateway is further configured to:

maintain a mapping relationship between respective bus addresses of the one or more bus units and respective unit identifications of the one or more bus units, and the respective unit identifications being used by the controller.

6. The control device of claim 5, wherein the gateway is configured to perform the information exchange by:

receiving a data access instruction from the controller, the data access instruction comprising a target unit identification of the bus unit to be accessed and a first storage address of data to be accessed;

determining, based on the mapping relationship, a target bus address corresponding to the target unit identification from the respective bus addresses;

converting the first storage address into a second storage address applicable to the bus; and executing the data access instruction according to the target bus address and the second storage address.

7. The control device of claim 6, wherein the gateway is further configured to:

obtain respective operation data in the one or more bus units based on the respective bus addresses of one or more bus units;

store the respective operational data in the gateway according to the respective bus addresses and operation data of the one or more bus units applicable to the storage address of the bus in the respective bus units; and wherein the gateway is configured to execute the data access instruction by:

reading operation data corresponding to the target bus address and the second storage address from the stored respective operation data; and sending the read operation data to the controller.

8. The control device of claim 1, wherein the gateway is further configured to:

obtain, via the bus, respective setting information of the one or more bus units; and store the respective setting information of the one or more bus units.

9. The control device of claim 8, wherein the gateway is further configured to:

in response to determining that a second bus unit connected to a second connection unit of the plurality of connection units is replaced with a third bus unit, determine whether a model of the third bus unit matches a model of the second bus unit;

in response to determining that the model of the third bus unit does not match the model of the second bus unit, present, via the third bus unit, a second prompt information indicating that the models do not match; and in response to determining that the model of the third bus unit matches the model of the second bus unit, configure the third bus unit based on the stored setting information of the second bus unit.

10. The control device of claim 1, wherein the gateway comprises a plurality of circuit boards respectively applicable to different communication protocols, and the gateway is further configured to switch between the plurality of circuit boards according to the communication protocols between the gateway and the controller.

11. A control method comprising:

each of one or more bus units obtaining, in response to being connected to a connection unit of a plurality of connection units, a bus address for the bus and corresponding to the connection unit, wherein the plurality of connection units store respective location identifications, wherein the location identification stored in each of the plurality of connection units is related to a location of the connection unit in the control device, and wherein each of the one or more bus units obtains the bus address for the bus and corresponding to the connection unit by:

obtaining the location identification stored by the connected connection unit; and converting the obtained location identification into the bus address; and a gateway performing information exchange between a controller and the one or more bus units based on the respective bus addresses of the one or more bus units.

12. The control method of claim 11, wherein each of the one or more bus units further stores the obtained location identification.

13. The control method of claim 12 further comprising:

the gateway obtains a first location identification stored in a first bus unit in response to the first bus unit being connected to a first connection unit of the plurality of connection units; and the gateway verifies consistency of the first location identification and a second location identification stored in the first connection unit.

14. The control method of claim 13, further comprising:

in response to the first location identification being inconsistent with the second location identification, the gateway presents a first prompt information via the first bus unit, where the first prompt information indicates a connection error of the first bus unit.

15. The control method of claim 11 further comprising:

the gateway maintains a mapping relationship between respective bus addresses of the one or more bus units and respective unit identifications of the one or more bus units, and the respective unit identifications being used by the controller.

16. The control method of claim 15, wherein the gateway performs the information exchange by:

receiving a data access instruction from the controller, the data access instruction comprising a target unit identification of the bus unit to be accessed and a first storage address of data to be accessed;

determining, based on the mapping relationship, a target bus address corresponding to the target unit identification from the respective bus addresses;

converting the first storage address into a second storage address applicable to the bus; and executing the data access instruction according to the target bus address and the second storage address.

17. The control method of claim 16, further comprising:

the gateway obtains respective operation data in the one or more bus units based on the respective bus addresses of one or more bus units;

the gateway stores the respective operational data in the gateway according to the respective bus addresses and operation data of the one or more bus units applicable to the storage address of the bus in the respective bus units; and wherein the gateway executes the data access instruction by:

reading operation data corresponding to the target bus address and the second storage address from the stored respective operation data; and sending the read operation data to the controller.

18. A non-transitory computer-readable storage medium having a computer program stored thereon, the program, when executed by a processor, causing a control method to be implemented, the control method comprising:

each of one or more bus units obtaining, in response to being connected to a connection unit of a plurality of connection units, a bus address for the bus and corresponding to the connection unit, wherein the plurality of connection units store respective location identifications, wherein the location identification stored in each of the plurality of connection units is related to a location of the connection unit in the control device, and wherein each of the one or more bus units obtains the bus address for the bus and corresponding to the connection unit by:

obtaining the location identification stored by the connected connection unit; and converting the obtained location identification into the bus address; and a gateway performing information exchange between a controller and the one or more bus units based on the respective bus addresses of the one or more bus units.

* * * * *